(12) United States Patent
Hong et al.

(10) Patent No.: US 12,394,107 B2
(45) Date of Patent: Aug. 19, 2025

(54) METHODS AND SYSTEMS FOR VIRTUAL TRY ON (VTO) PROVIDING AN AUGMENTED REALITY EXPERIENCE

(71) Applicant: L'Oreal, Paris (FR)

(72) Inventors: Xuanyi Hong, Toronto (CA); Jeffrey Houghton, East York (CA)

(73) Assignee: L'Oreal, Paris (FR)

( * ) Notice: Subject to any disclaimer, the term of this patent is extended or adjusted under 35 U.S.C. 154(b) by 219 days.

(21) Appl. No.: 18/072,039

(22) Filed: Nov. 30, 2022

(65) Prior Publication Data
US 2024/0177360 A1 May 30, 2024

(51) Int. Cl.
G06T 11/00 (2006.01)
G06F 3/0482 (2013.01)
G06Q 30/0601 (2023.01)

(52) U.S. Cl.
CPC ............ *G06T 11/00* (2013.01); *G06F 3/0482* (2013.01); *G06Q 30/0643* (2013.01); *G06T 2200/24* (2013.01)

(58) Field of Classification Search
CPC ... G06T 11/00; G06T 2200/24; G06F 3/0482; G06Q 30/0643
See application file for complete search history.

(56) References Cited

U.S. PATENT DOCUMENTS

| | | | |
|---|---|---|---|
| 11,263,821 B1 | 3/2022 | Singh et al. | |
| 2006/0178957 A1* | 8/2006 | LeClaire | G06Q 40/12 705/30 |
| 2018/0075524 A1 | 3/2018 | Sartori Odizzio et al. | |
| 2021/0407162 A1 | 12/2021 | Charraud et al. | |
| 2022/0215463 A1 | 7/2022 | Sartori Odizzio et al. | |
| 2022/0215633 A1* | 7/2022 | Neulander | G06F 8/36 |
| 2022/0230401 A1 | 7/2022 | Singh et al. | |
| 2023/0260229 A1 | 8/2023 | Singh et al. | |
| 2023/0401632 A1* | 12/2023 | Cardelino | G06T 19/006 |

OTHER PUBLICATIONS

French Preliminary Search Report and Written Opinion issued Dec. 26, 2013, in FR 2302382 (with English Translation of Category of Cited Documents) citing documents 1, 4, 6 therein, 10 pages.
International Search Report and Written Opinion issued Jan. 4, 2024, in PCT/EP2023/082620, citing documents 1, 4, 6 therein, 13 pages.

* cited by examiner

*Primary Examiner* — Sing-Wai Wu
(74) *Attorney, Agent, or Firm* — Oblon, McClelland, Maier & Neustadt, L.L.P.

(57) ABSTRACT

Methods and systems for VTO provide an augmented reality experience. Webpage components define different VTO experiences for different products/services and different instances (e.g., hair, nail or makeup products with different colors). The components can integrate with a webpage, for example, as an advertisement. When executed on a user device, the components provide a VTO for a particular product including a collection of interfaces that provide a model image experience. Pre-rendered "after" model images using an appropriate VTO engine show the product/services. The after model images can be presented prior to a live user image experience enabled by a corresponding user device executed VTO engine rendering a product instance to a user image. The model experience can be presented while the user image experience (e.g. its VTO engine) is readied. The model experience can be presented in a same/overlapping region as the user image experience, for example.

18 Claims, 13 Drawing Sheets

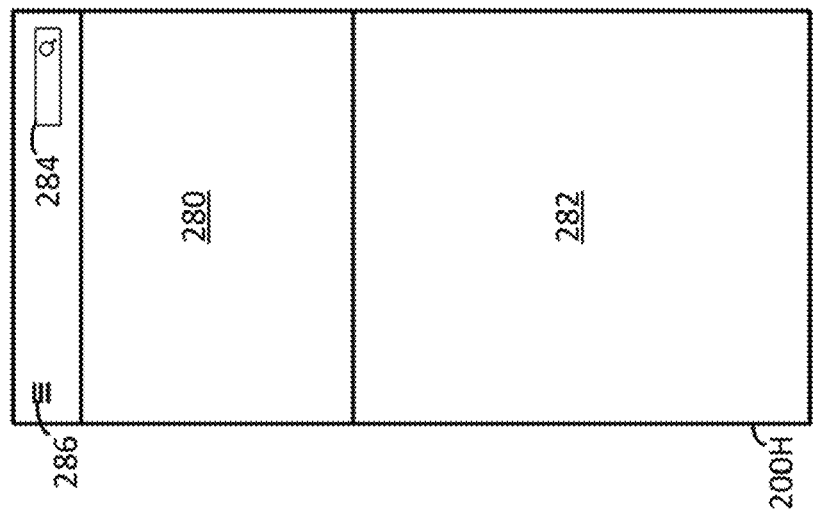
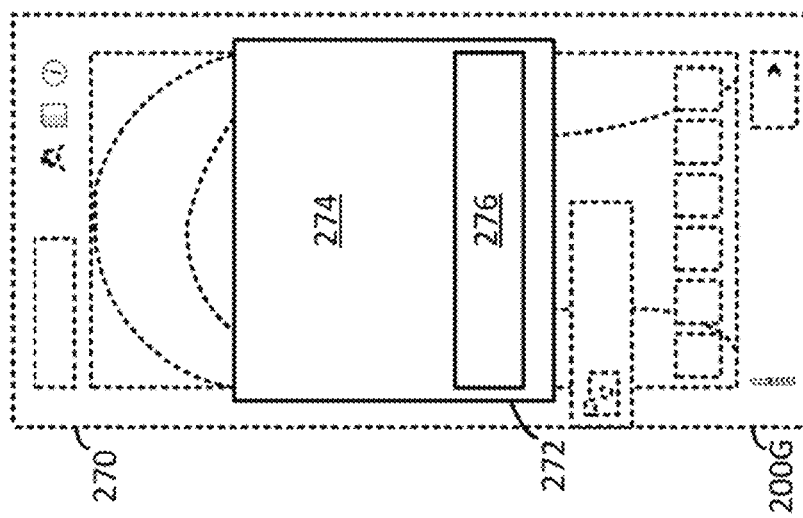

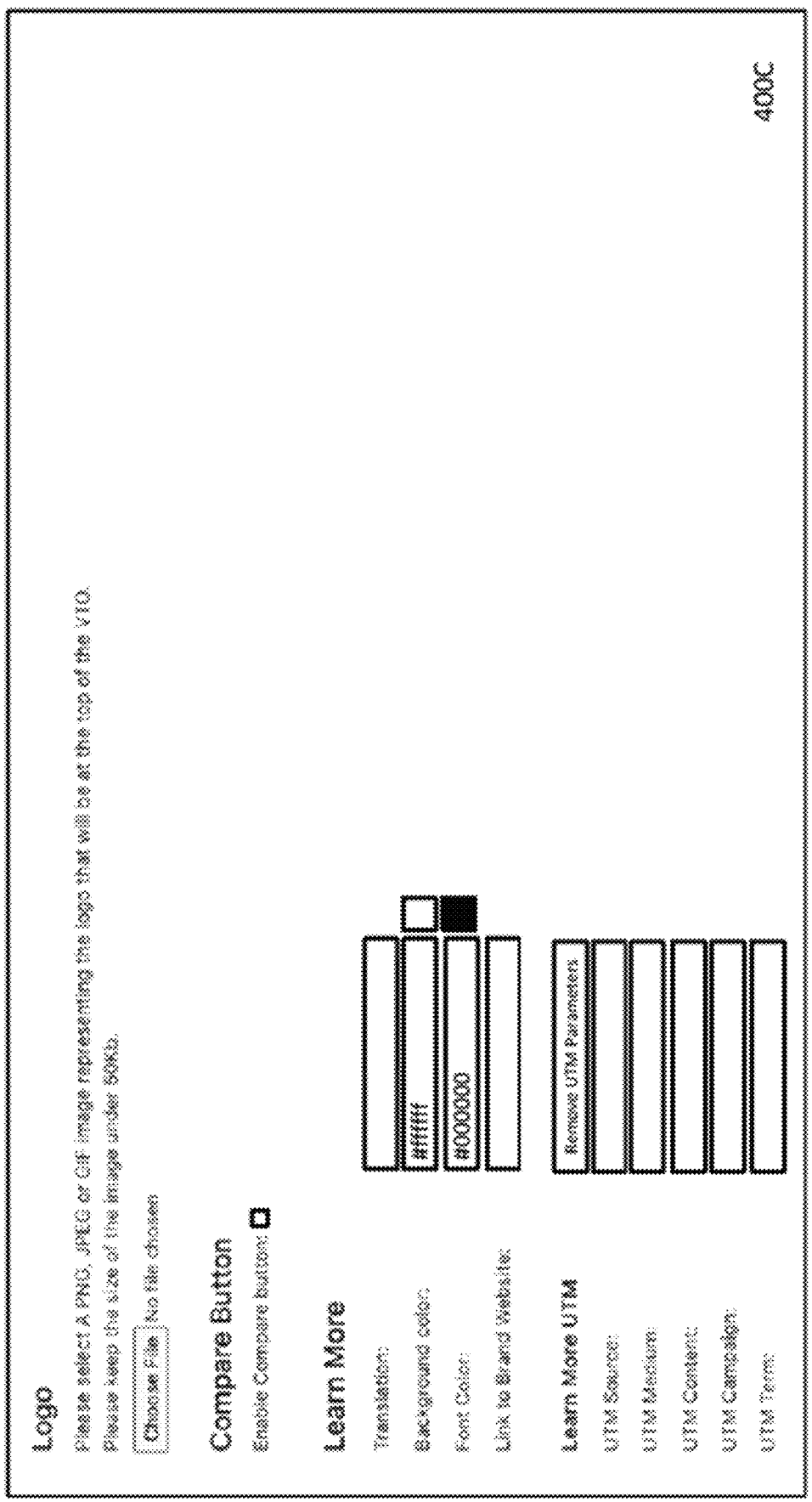

500 ↘

Providing a portal to receive customization information to customize webpage components defining a virtual try on (VTO) experience for inclusion in a webpage to be presented by a user computing device, the webpage components, when executed by the user computing device, providing a collection of interfaces to present a model image experience to virtually try on instances of a product or a service
502

Generating the webpage components using the customization information received via the portal and a VTO engine, wherein for each instance of the product or service made available to virtually try on, the VTO engine pre-renders a model after image corresponding to an image of a model, wherein the webpage components are generated to comprise each model after image and a user VTO engine that corresponds to the VTO engine used to pre-render each model after image
504

Providing the webpage components for execution by the user computing device, wherein the user VTO engine is configured to render a user after image for presenting to virtually try on the instances of the product or service on a before image of the user to provide a user image experience
506

```
┌─────────────────────────────────────────────────────────────┐
│ Presenting a virtual try on (VTO) experience to virtually try on instances of a product or │
│ a service, the VTO experience presented in two parts comprising a model image │
│ experience and a user image experience providing an augmented reality │
│                                                         602 │
└─────────────────────────────────────────────────────────────┘
                              ↓
┌─────────────────────────────────────────────────────────────┐
│ Displaying after model images pre-rendered with effects associated with the instances │
│ of the product or service by a first VTO engine, the after model images received by the │
│ computing device as a part of webpage components executed by the computing device │
│ to provide the VTO experience                           604 │
└─────────────────────────────────────────────────────────────┘
                              ↓
┌─────────────────────────────────────────────────────────────┐
│ Displaying after user images rendered with effects associated with the instances by a │
│ corresponding second VTO engine executed by the computing device using one or │
│ more user before images of the user received from a camera of the computing device │
│                                                         606 │
└─────────────────────────────────────────────────────────────┘
                              ↓
┌─────────────────────────────────────────────────────────────┐
│ Presenting the model image experience prior to presenting the user image experience, │
│ while the user image experience is being readied by the computing device. │
│                                                         608 │
└─────────────────────────────────────────────────────────────┘
```

Fig. 6

METHODS AND SYSTEMS FOR VIRTUAL TRY ON (VTO) PROVIDING AN AUGMENTED REALITY EXPERIENCE

FIELD

This disclosure relates to computer processes including image processing and VTO of effects that provide an augmented reality experience.

BACKGROUND

Image processing techniques enable a VTO engine to receive an image and apply an effect thereto. The engine can simulate an effect of a product and/or an effect of a service, for example. When applied to the image of a user of such a product and/or service, particularly a video image, the VTO engine can provide an augmented reality effect. The user virtually tries on the product, for example.

VTO engines can be made available as a component of a website such as for download via a webpage for use while a user engages with the webpage. Executing a VTO engine on the user's device means that user supplied images, typically in the form of a selfie, are processed locally. Local processing can simulate the effect in nearer to real time than when user images and augmented images are communicated. When the engine is executed remotely relative to the user's device, such as in the cloud, the input and output images require communication between the user and the engine. Significant communication lag can reduce the real time simulation experience. Further, privacy is enhanced with local processing. However a disadvantage to local processing is the need to download and ready the engine to begin execution. Delays of a few seconds or more are common.

SUMMARY

Methods and systems for VTO provide an augmented reality experience. Webpage components define different VTO experiences for different products/services and different instances (e.g., hair, nail or makeup products with different colors). The components can integrate with a webpage, for example, as an advertisement. When executed on a user device, the components provide a VTO for a particular product including a collection of interfaces that provide a model image experience. Pre-rendered "after" model images using an appropriate VTO engine show the product/services. The after model images can be presented prior to a live user image experience enabled by a corresponding user device executed VTO engine rendering a product instance to a user image. The model experience can be presented while the user image experience (e.g. its VTO engine) is readied. The model experience can be presented in a same/overlapping region as the user image experience, for example.

BRIEF DESCRIPTION OF THE DRAWINGS

FIGS. 2A, 28, 2C, 2D, 2E, 2F, 2G and 2H are representations of a GUI showing aspects of a VTO experience in accordance with an embodiment.

FIGS. 4A, 48, 4C and 4D are illustrations of user interfaces of a configuration portal in accordance with an embodiment.

FIGS. 5A, 5B and 6 are flowcharts of operations in accordance with respective embodiments.

DETAILED DESCRIPTION

Figure 1:
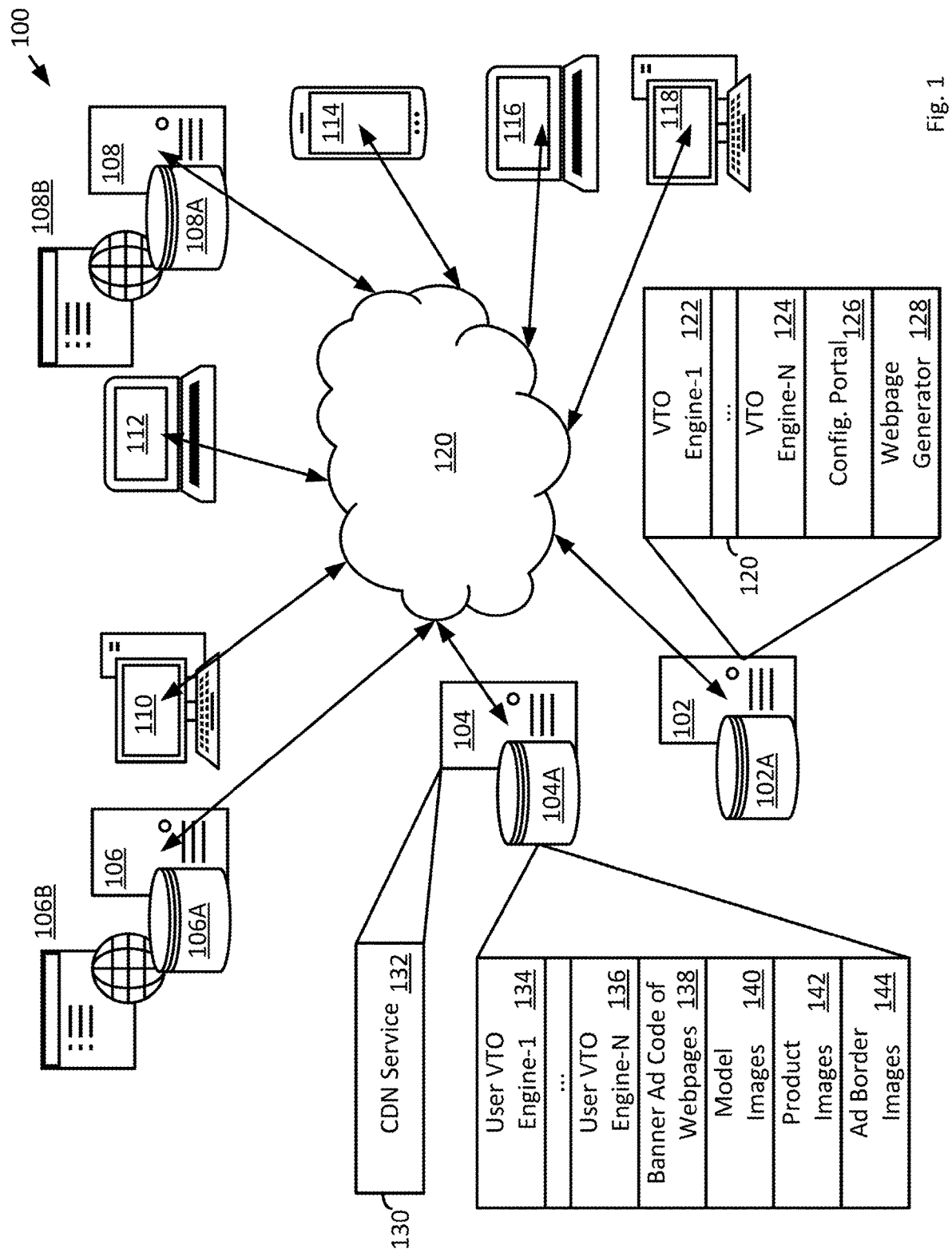
FIG. 1 is an illustration of a computing environment 100 suitable for practicing the teaching(s) herein, in accordance with an embodiment.

FIG. 1 is an illustration of a computing environment 100 suitable for practicing the teaching(s) herein, in accordance with an embodiment. Computing environment 100 comprises a plurality of computing devices 102, 104, 106, 108, 110, 112, 114, 116 and 118 coupled for communication to one or more of each other via a communications network 120. The communications network is simplified and can comprise one or more communications networks, whether public, private, wired and/or wireless and can include the Internet. Computing devices 102, 104, 106 and 108 are illustrated as a form of server device for convenience only and may take other forms as understood to a person of ordinary skill in the art. Computing devices 110 and 112 are respectively illustrated as a form of desktop device and laptop device for convenience only and may take other forms as understood to a person of ordinary skill in the art. Computing devices 114, 116 and 118 are respectively illustrated as a form of handheld mobile device (e.g. a smartphone) laptop device and desktop device for convenience only and may take other forms as understood to a person of ordinary skill in the art.

Computing device 102 is coupled to a data storage device 102A providing a data store, such as a database. Computing device 102 comprises a memory 120 (shown expanded from device 102 for convenience). Memory 120 stores computer readable instructions, for example, as software components. Memory 120 also stores data. When executed by a processor (not shown) of the computing device 102, the computer readable instructions cause the computing device to perform one or more (computer implemented) methods, as will be apparent. Any of the computing devices herein can be similarly structured and configured via computer readable instructions.

In an embodiment, memory 120 stores a plurality (e.g. 1 . . . N) of VTO engines such as VTO engine-1 122 . . . VTO engine-N 124, where each engine applies a respective effect to images it receives. Memory 120 further stores software components providing a configuration portal 126 and a webpage generator 128. Memory 102 can store other software components (not shown) such as an operating system, communications components, database components, etc. At least some of the components in memory 120 can also be stored in data storage device 102A. In an example, computing device 102 comprises a server device and can comprise input, output and our input/output devices (not shown), such as a display device, a keyboard, a pointing device such as a mouse, etc. User oriented computing devices can comprise a camera to capture user images such as selfie images.

As described further herein below, computing device 102 provides a configuration portal 126 (e.g. configured as a Software as a Service (SaaS) portal) to receive information for automatically generating webpage components via generator 128. The information received can be stored to data storage device 102A. The information received can reference data previously stored to data storage device 102A for example, brand information and associated product information. The generated webpage components provide a VTO experience in accordance with one of the VTO engines. VTO engines and effects are described further below.

In an embodiment, the webpage components define a document that can be integrated into a broader or current HTML (hyper text markup language) document. The document to be integrated can be integrated using an inline frame or iFrame in the current document. Other known techniques can also be used. In an embodiment, the webpage components define an advertisement, as further described. In an embodiment, the advertisement is used to define a Display Ad for use in the Google Ads advertising service from Google, Inc. Typically such an advertisement is integrated into a website of a third party—i.e. not from a website provided by the brand. In an embodiment, the webpage components are integrated into a store's or a brand's own website to provide a function of the website and not as an advertisement, per se. The configuration portal 126 is further described below with reference to FIGS. 4A, 4B, 4C and 4D.

The webpage components are generated by webpage generator 128 such as from templates or predefined code having placeholders for configuration information. The portal 126 is configured to define respective instances of webpage components such as for different brands and a particular brand's respective products and instances thereof (e.g. different colors or other product aspects). For example, in an embodiment, Brand A can have a plurality (M) of lipstick (LS) products (e.g. LS-1, LS-2 . . . LS-M). Brand A can define respective webpage components providing a VTO experience for one or more of the M lipstick products using the VTO engine for lip (or lipstick) effects. Each VTO experience can present chosen lipstick effects—e.g. chosen lipstick colors. Other brands (e.g. Brand B) can similarly define webpage components for their respective lipstick products. Any of Brand A, Brand B or another brand can define webpage components for other products using an applicable VTO engine provided by computing device 102. Computing device 102 and data storage device 102A can store brand information including product information such as to provide a content management system. Information for different brands can be segregate such as in different data storage devices (not shown), if desired.

In an embodiment, the webpage components define a banner advertisement for inclusion within a webpage, for example. When an instance of the webpage components are executed by a particular user computing device, the components provide a VTO experience for a particular effect that can comprise: 1) an effect applied to a preselected model; and 2) an effect applied to a user image such as to provide an augmented reality experience as further described.

Once completed and ready for use by users, the respective webpage components are stored to a data storage device 104A (e.g. a data store such as a database) of computing device 104. Computing device 104 comprises a memory 130 storing software components such as for providing a content distribution network (CDN) service 132. CDN service 132 is configured to provide the webpage components for execution by a user's computing device (e.g. 114-118). While only a single computing device 104 providing the CDN service 132 is shown, it is understood that multiple computing resources (e.g. additional instances of computing device 104, etc.) that are geographically spaced in distributed data centers can be provided to facilitate high availability and performance relative to end users. In embodiments, webpage components are customizable to target local markets such as for a particular country or regions. Webpage components can be provided via a CDN service that is responsive to the target market associated with the components. In an embodiment, customization information received includes country or region identification, for example.

An instance of webpage components for a particular VTO experience includes a user VTO engine (e.g. one of user VTO engine-1 134 . . . user VTO engine-N 136, stored in device 104A) that corresponds to one of VTO engine-1 122 to VTO engine-N 124 that was used to generate the instance of the webpage components. The user VTO engine is configured to execute on the user computing device to process a user provided images and render the effect.

In a banner ad embodiment, the website components can comprise code portions for the banner ads 130, model images 140, product images 142, and ad border images 144. These components can be stored in data storage device 104A, for example. Model images can include a plurality of after images for each model that is part of the model image experience. The model images can include a before image. For example, the before image can comprise an image of the model without an effect applied or with a different effect than one that is part of the virtual try on. The after images comprise a pre-rendered effect applied to an image of the model, for example. In an embodiment, each of the after images for a model and for a particular try on experience differs only in the effect applied. The after images can include one pre-rendered image for each instance of the effect that is part of the particular model image experience. In an embodiment, a model image experience for a virtual lipstick try on provides 6 try one colors for a lipstick product. The model images for such a try on include, for each model that is part of the experience, a before image without lipstick or without one of the try on colors and 6 after images, one for each of the try on colors rendered from the before image. The same model can be used for other virtual try on experiences applying other effects.

The webpage components 134-144 are configured for integration into webpages served by, for example, an on-line retailer operating an e-commerce store website or a respective brand providing an on-line information website and/or e-commerce website, or for integration into a website, which may be a third party website, that has integrated advertisements such as Display Ads. Each of computing devices 106 and 108 represent webpage servers having respective data stores 106A and 108A storing respective webpages 106B and 108B. A webpage 106B or 108B can be provided to any of the user devices 114-118, for example, upon appropriate request such as by browsing the associated website. Each of the webpages 106B and 108B include appropriate code calling or otherwise linking, via the CDN service 132, to the respective webpage components in data store 104A. Computer device 102, for example, can provide the appropriate information (e.g., code or other references) for inclusion in the appropriate webpages 106B and 108B such as in response to the use of the configuration portal 126. Computing devices 110 and 112 represent store-owned and/or brand-owned computing devices that communicate via configuration portal 126 to define the respective webpage components for the store and/or brand webpages 106B and 108B. In an example, device 110 is associated with Brand A that sells lipstick and device 112 is associated with brand B that sells hair dye.

In an embodiment, each of the N VTO engines (e.g. VTO engine-1 122 . . . VTO engine-N 124) provides a different VTO experience in which a different respective effect is applied to an image. For example, which is not to be limited, a VTO experience may relate to any of a hair, a (finger/toe) nail or a makeup try on. A makeup try on can relate to any one or more of the lips, eyes, eye brows, cheeks, or other portion(s) of a face. A VTO experience may apply more than one effect and relate to more than one portion of an image that is altered to produce the VTO experience. Different instances of a same effect can be provided by a respective VTO engine. For example, the different instances can simulate different colors of a same effect (e.g. a lipstick effect). Color is an example of how instances of an effect may differ and effects may differ on different scales (e.g. other than a color scale), for example. Instances of a particular effect (e.g. lipstick effect) may vary in more than one manner—e.g. by color, sheen (e.g. matte, glossy, glittery, etc.) and contour or shape of the effect applied to the lip region.

A VTO can relate to an effect produced by a product and/or a service. For example a product may comprise a hair dye and the associated effect may comprise a hair color change. A service may comprise a hair salon service and the associated effect may comprise a hair cut and/or hair style. A product may comprise a teeth whitener product and the associated effect may comprise whiter teeth. A service may comprise an orthodontics service and the effect may comprise straighter teeth or the effect may comprise teeth with an appliance applied thereto. Other facial or related effects can include shaping and/or contouring of any one or more of eyes, eye brows, nose, cheeks, chin, neck, ears, etc. which may simulate a cosmetic surgery or other altering effect.

In brief, in an embodiment, each of the N VTO engines comprises components to: analyze an image and/or a plurality of images such as a video; localize a region of each image where the try on effect is to be applied to simulate a product or service such as in an augmented reality manner; and overlay or otherwise apply the effect to the image for display. The VTO engine can include components to process the image using various techniques including deep learning techniques in the form of an artificial neural network. An example of a VTO engine is ModiFace's Makeup Virtual Try On from ModiFace Inc., which may track a face from an image or a frame in a video, identify the lip region within that face, and recolour that region to represent a physical makeup product.

In an embodiment, the N VTO engines 122 . . . 124 are configured to execute on computing device 102. For each image that an engine receives as an input, that engine produces an image to which an effect is applied as output. The input and output images can be stored in the data storage device 102A. The input and output images comprise before and after images.

Operations of server 102 thus enable a batch process for producing VTO after model images where effects are applied via a VTO engine. Via configuration portal 126, a user thereof can upload a plurality (e.g. X) of model images and choose a plurality (e.g. Y) of products, such as from data store 102A, and automatically have X×Y pre-rendered after model images created for use in VTO experiences. Rather than perform photo-shoots with models and products, the operations of server 102 makes VTO experience after model images automatically.

In an embodiment, the configuration portal 126 is configured to provide an interface, such as a web-based interface using SaaS techniques, to receive information (e.g. data) with which to define instances of the webpage components. Such webpage components, when executed on a user's computing device (for example, one of devices 114, 116 or 118), enable a user thereof to receive a VTO experience associated with the VTO engine used to define the web page components. In an embodiment, the user device also receives a user instance of the VTO engine for execution on the user device to generate an augmented reality experience for a user of the user device.

In an embodiment, the webpage components enable a VTO experience comprising a model image experience and a user image experience for augmented reality. In an embodiment, the model image experience is presented for at least a portion of the time while the user image experience is loaded and readied by the user's computing device 114. In an embodiment, the model image experience is presented as an interactive graphical user interface (GUI) comprising a collection of interfaces, such as a landing page, a loading page and a collection of pop-up interfaces, defining a banner ad that is displayed over a same portion of the webpage in which the user image experience of the VTO is presented.

FIGS. 2A, 2B, 2C, 2D, 2E, 2F, 2G and 2H are illustrations of interfaces 200A, 200B, 200C, 200D, 200E, 200F, 200G and 200H, of the GUI in the form of a banner ad in accordance with an embodiment. The GUI can be presented such as by any one of computing devices 114, 116 or 118, for example, where the GUI is enabled by an instance of the webpage components configured using the computing device 102. A number of the interfaces' components, including images, controls and text content are customizable via configuration platform 126 as further described herein. Some of the pop-up interfaces can be optional. Inclusion of an optional pop-up interface in the webpage components can be configured using the configuration portal 126.

Interface 200A represents a landing page and presents an image 202 of a preselected model along with controls 204 to select between instances of an effect that are to be applied to the image of the model. Each of the controls 204 is associated with a respective image of the product such as a product swatch. Selecting a particular one of the controls 204 changes the image 202 of the preselected model to show the respective instance of the effect associated with the particular one of the controls 204. The product swatch may be a color swatch. In the present example, the effect is a makeup effect, namely a lipstick effect as represented by an icon 206. Product information (not shown) can be presented such as at region 208. A "learn more" control 210 is provided to advance to a more information interface (e.g. interface 200H of FIG. 2H) with region 212 available for text to display with the control.

Provided is a border element 214 about the model image 202. The border element can present a border image or design to complement the interfaces. The various controls, text and images of interfaces 200A-200H may appear atop the border element, for example.

In an embodiment, icons 216, 218 and 220 are associated with respective controls to: a) invoke an interface (e.g. interface 2008 of FIG. 2B) to select between different preselected models for display as image 202, b) invoke a compare function to compare between no effect applied and the selected effect applied to image 202 (not shown), for example using a slider control when the compare function is selected, and 3) present further information. It is understood that a compare function could compare between two effects, one applied to each of two of the same model images. Region 221, for example, provides an area for a logo to be presented.

Icon 222 and message region 224 are associated with the user image experience. The icon and/or message region are associated with a control to "start my camera", for example, to initiate the user image experience. In an embodiment, responsive to an invocation of the control, a computer process asynchronously starts loading the user image experience in the background, with a callback to update the main UI once the loading is done. The message region is configured to display such a message text, which can be customized.

Figure 2A:
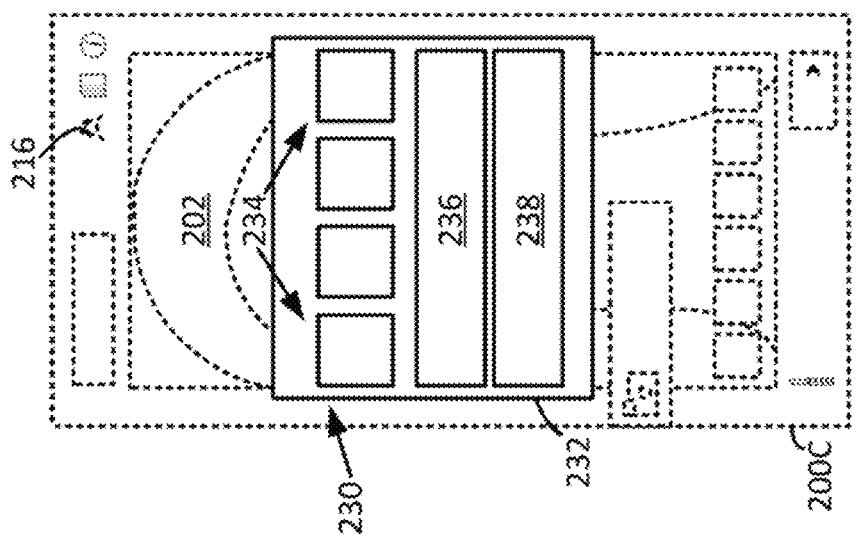
Figure 2B:
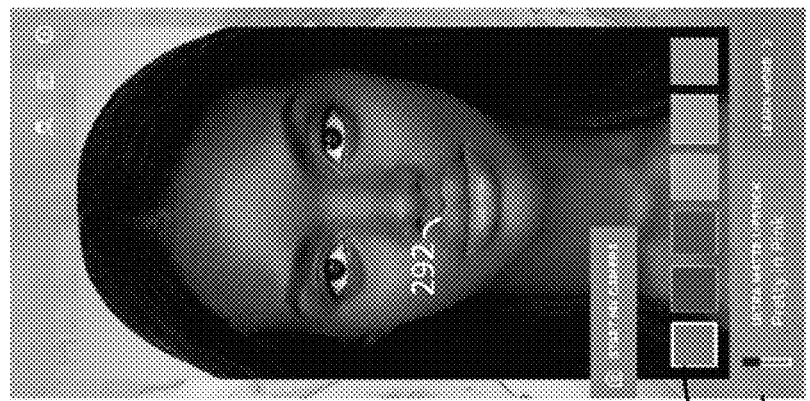

FIG. 2B is an image, in grayscale, showing interface 200B, representing an embodiment of interface 200A. Lip region 290 presents a lip effect corresponding to control 204A (one of controls 204) pre-rendered by one of VTO engine-1 to VTO engine-N configured for a lip effect.

Figure 2C:
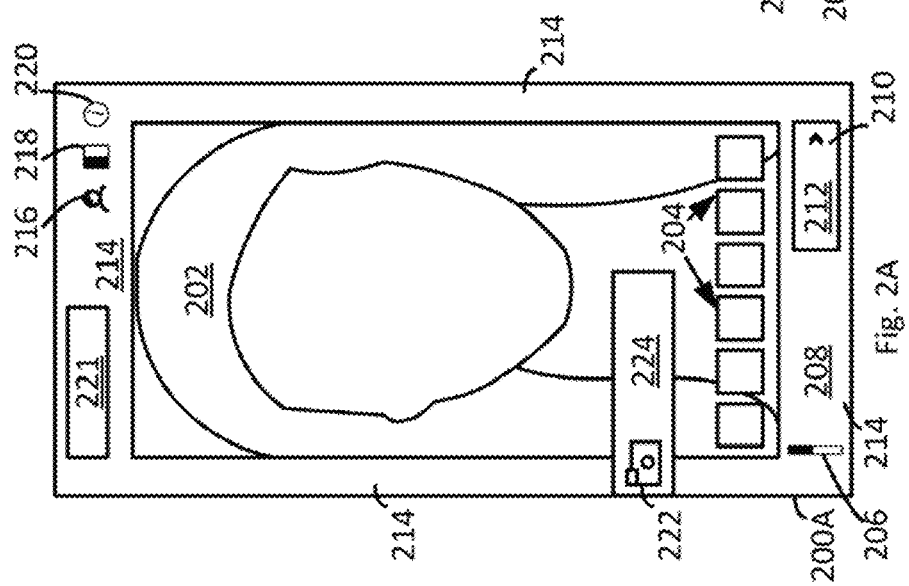

FIG. 2C shows interface 200C that is invoked via icon 216 (i.e., via its associated control) for selecting between a plurality of images of preselected models. Interface 200B shows a pop-up interface 230. In an embodiment, the pop-up interface 230 is present atop the landing page of interface 200A or a loading page of interface 200F (described below). The background interface 200A is shown in broken lines to represent a level of transparency behind pop-up interface 230. Interface 230 includes pop-up box 232 comprising a plurality (4) of model selection controls 234 where each is associated with a thumbnail image of a preselected model. Selecting one of the models changes the image 202 in interface 200A, for example, after the selection is confirmed. Regions 236 and 238 are associated with controls to confirm a model selection and return to interface 200A or 200F as applicable with the model image 202 changed, or to cancel the model selection pop-up interface to return without changing the image 202 of the model. The regions 236 and 238 can present customizable text for such controls.

Figure 2F:
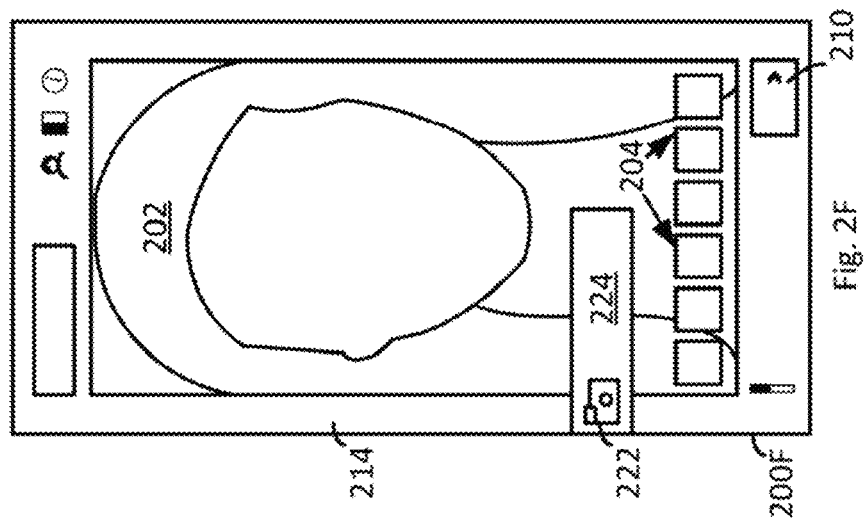
Figure 2E:
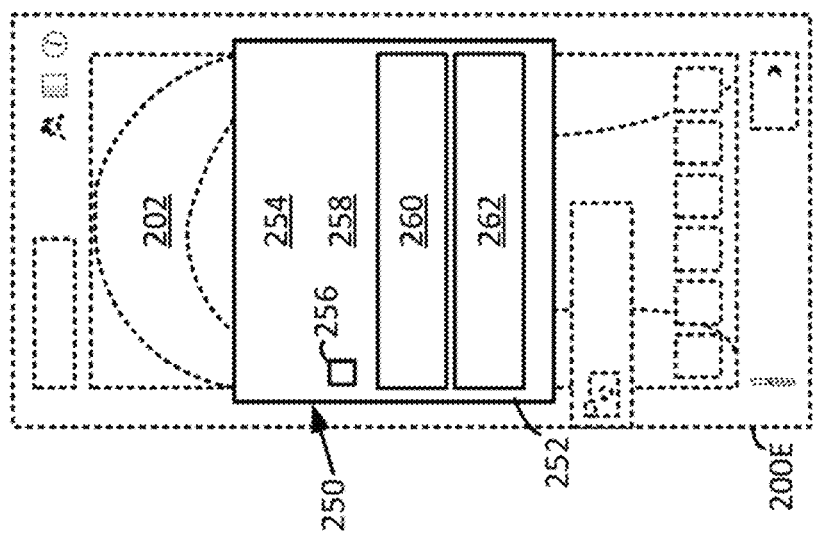
Figure 2D:
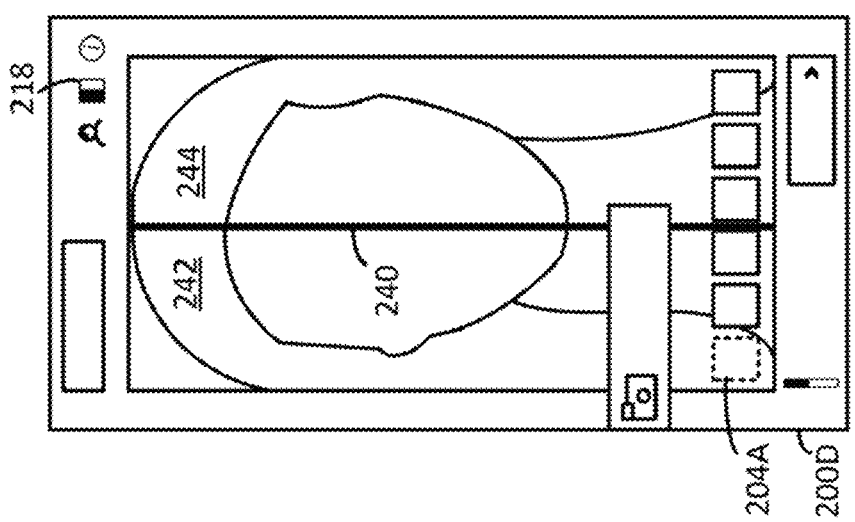

With reference to FIG. 2D, the compare function (e.g. as invoked by control 218) is illustrated in interface 200D, similar to an embodiment of interface 200A. In an embodiment, icon 218 invokes the compare function so that a slider control 240 is presented between a portion 242 of a first model image showing no pre-rendered effect applied to the model and a portion 244 of a second model image 242 showing a pre-rendered effect applied to the model. The slider control 240 divides the two portrait images 242 and 244 such that the two portions of such images present a whole image (other than a minor amount behind the slider control). In the embodiment, the effect applied corresponds to the effect selected via control 204A (one of the controls 204). The effect could be any one as selected by other ones of the controls. Slider control 240 is responsive to a gestural input, for example, that slides the control left or right (horizontally) relative to the portrait images (242 and 244) of the model. As the slider control 240 is moved to the left, the portion of the first model image 242 is reduced while the portion of the second model image 244 is increased. The opposite is applied when the slider moves to the right. The slider control 240 and its operation allows a "before/after" side by side comparison of an effect and no effect on the same model to reveal more or less of the effect.

With reference to FIG. 2E, in an embodiment, interface 200E is a pop-up interface 250 having pop-up box 252 presenting terms and conditions information. Interface 200E can be invoked via the control associated with icon 222 and/or region 224 to "start my camera". In an embodiment, the interface 200E is optional for example, included to comply with a local requirement applicable to the brand using the webpage components. Privacy related terms and conditions can be presented. Pop-up interface 250 can be presented over screen 200A similarly to pop-up interface 230.

Pop-up box 252 comprises a terms and condition text region with associated control 254, a consent checkbox control 256, a consent text region 258, an accept terms and conditions text region with associated control 260 and a cancel text region with an associated control 262. Terms and condition text region with associated control 254 can present text advising that use of the try-on permits the brand to process the user's image. The region can provide a link (a form of control) to the terms and conditions. The consent text region 258 can indicate a statement of consent (e.g. "I confirm that I have read the terms and conditions"). The user indicates consent by checking the checkbox control 256. The accept terms and conditions text region with associated control 260 confirms that the user has checked the checkbox control 256 and invokes the user's camera for the VTO engine to ready the device for the VTO experience. The GUI transitions to interface 200F, a loading page, for presenting while the engine loads, etc. The cancel text region with associated control 262 returns to interface 200A without invoking the camera or engine, etc. for the "live" user image VTO experience. It is understood that the control to invoke interface 200E can be invoked again should a user change their mind.

FIG. 2F shows interface 200F configured as a loading page. Interface 200F is similar to the landing page of interface 200A. It is understood that in an embodiment, interface 200A can transition to interface 200F without interface 200E if terms and conditions are not employed. In such as case interface 200F can be invoked via the control associated with icon 222 and/or region 224 to "start my camera".

Interface 200F permits a user to continue the model image experience while the device is readied for the user image experience. In an embodiment, message region 224 in interface 200F is updated to indicate that device is "enabling camera . . . ". Thus the "live" VTO assets (e.g., as referenced in the webpage components) are started in the background while the user can continue to explore the model image experience. In an embodiment, once the loading is done, the interface switches to live try-on (e.g., the user image experience). In another, not shown, message region 224 is updated to indicate live try on is ready and such can be invoked via icon 222 or message region 224. The loading will take some time because the experience needs to load the detection model, and live rendering data (e.g., the user image) into memory, in order to execute the live VTO as intended. Because the detection model is a large file and needs to download and load into memory, this can often take 3-10 seconds. Typically a transition to such a live interface can include presenting a timer type interface (e.g. comprising an animated icon) to signal to the user to wait and/or a blank screen while the computing device is fully readied for the live experience.

FIG. 2G shows interface 200G presenting a pop-up interface 270 with pop-up box 272. Pop-up interface 270 can be presented over interface 200A or 200F and is invoked by icon 220 and its associated control. Pop-up box 272 presents a text region 274 for information to understand the VTO experience and a close text region and control 276 to return to the interface from which the pop-up interface 270 was invoked.

FIG. 2H shows interface 200H presenting a brand page for information such as in image region 280 and text region 282. Interface 200H is invoked from learn more control 210 and its pop-up interface 270 can be presented over interface 200A or 200F. Interface 200H can be a linked webpage provided by another website. In an example, where interfaces 200A-200G are components of an advertisement integrated into a first webpage from a first website, the interface 200H can be a different webpage from a different website (e.g. the brand's webpage and website). In the embodiment as illustrated, a search control 284 to search the website and menu control 286 for the website are included.

For the model image experience, the website components comprise (and the interfaces 200A and 200F present) a plurality of images 202 for each preselected model. The website components include an image for each instance of the effect as applied to the image of the model. That is, the effect is applied such as by computer 102 using one of the VTO engines 122 . . . 124. The effect/image is pre-rendered, for example, relative to the time the control for the instance of the effect is selected by the user. The VTO engine on the user device does not apply the effect. There is no loading time required under this light-weight model image experience with pre-rendered model images.

Figure 3A:
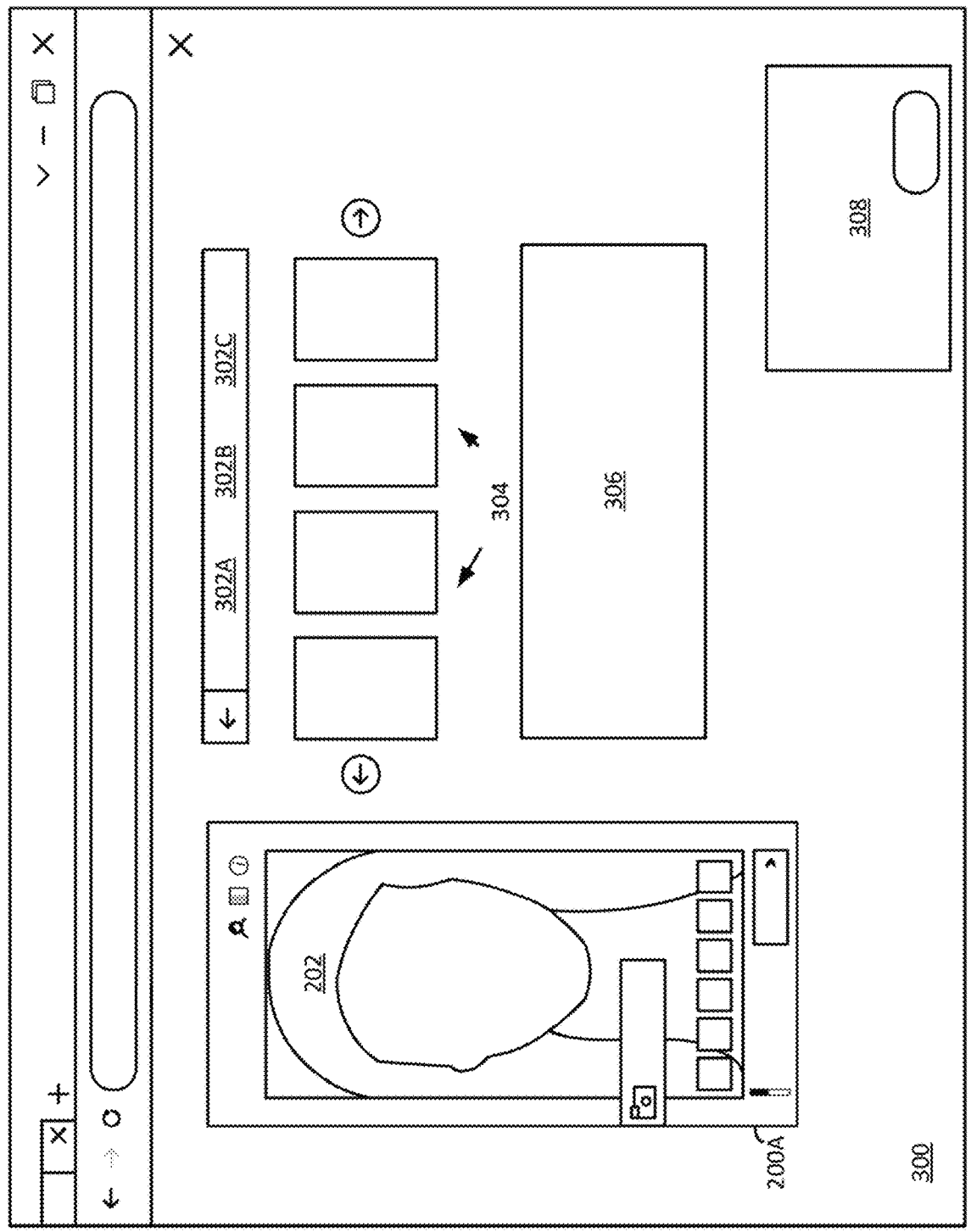
FIGS. 3A and 3B are illustrations of a website GUI showing aspects of a VTO experience in accordance with an embodiment.
Figure 3B:
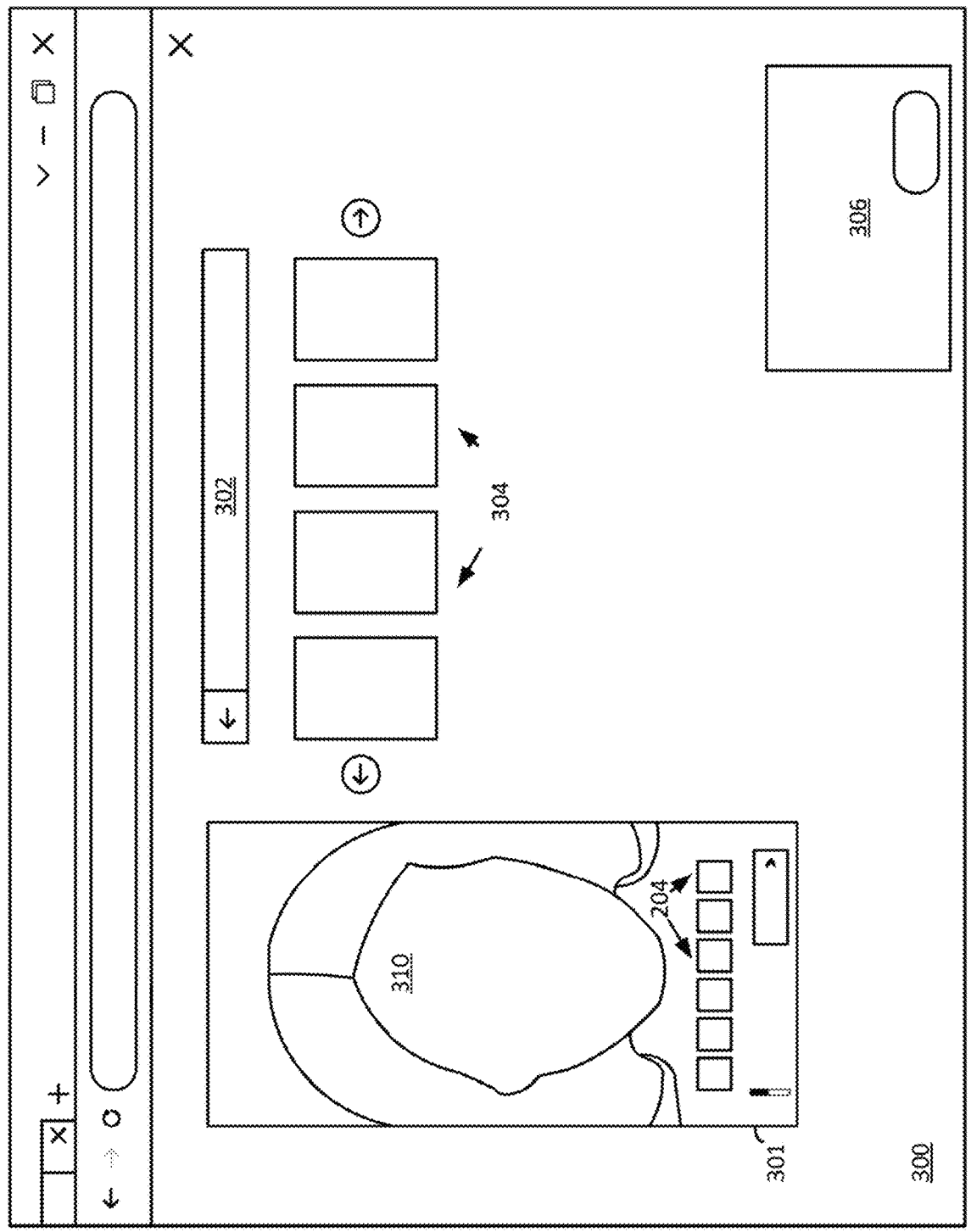
Figure 4A:
Figure 4B:
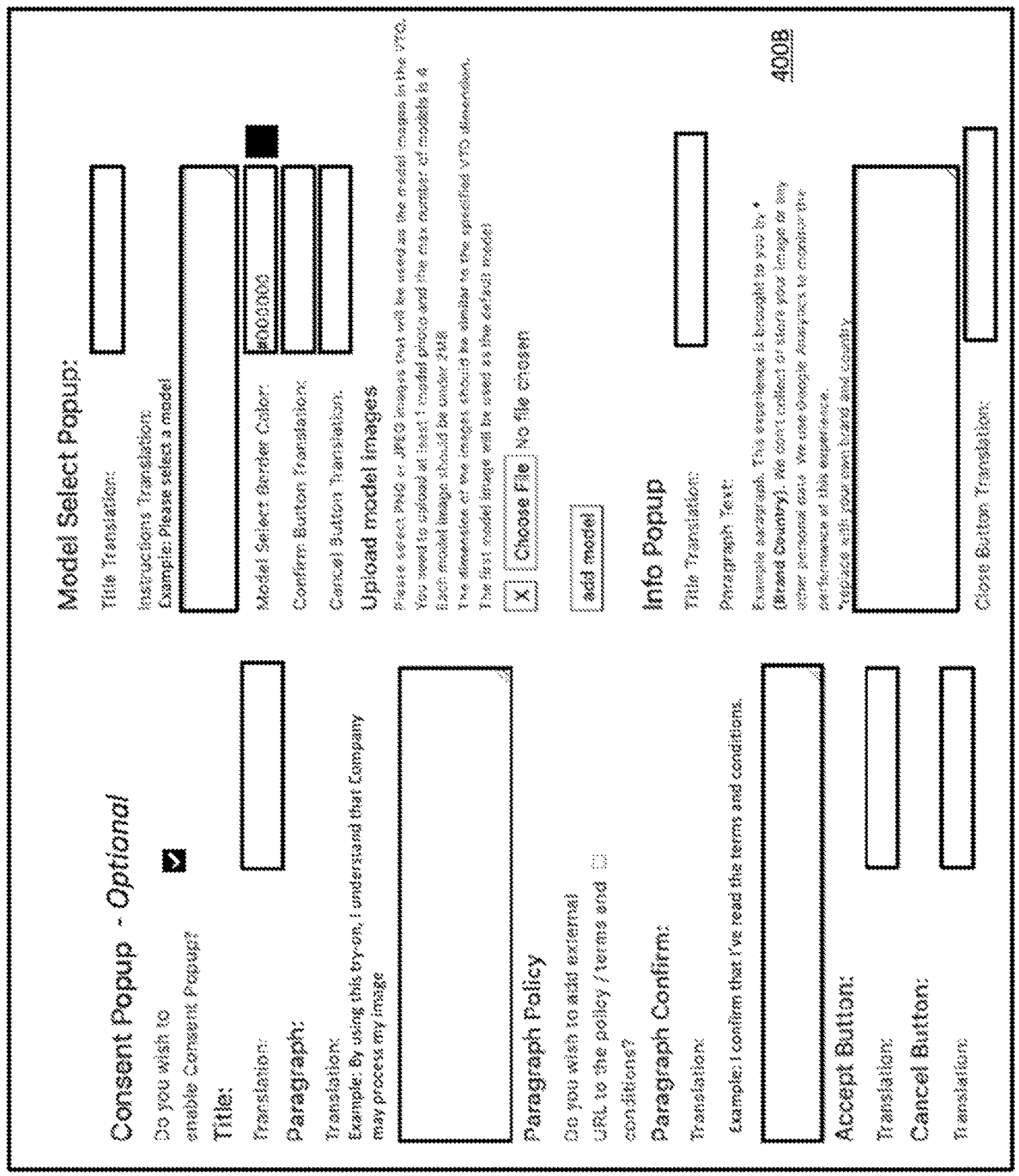
Figure 4D:
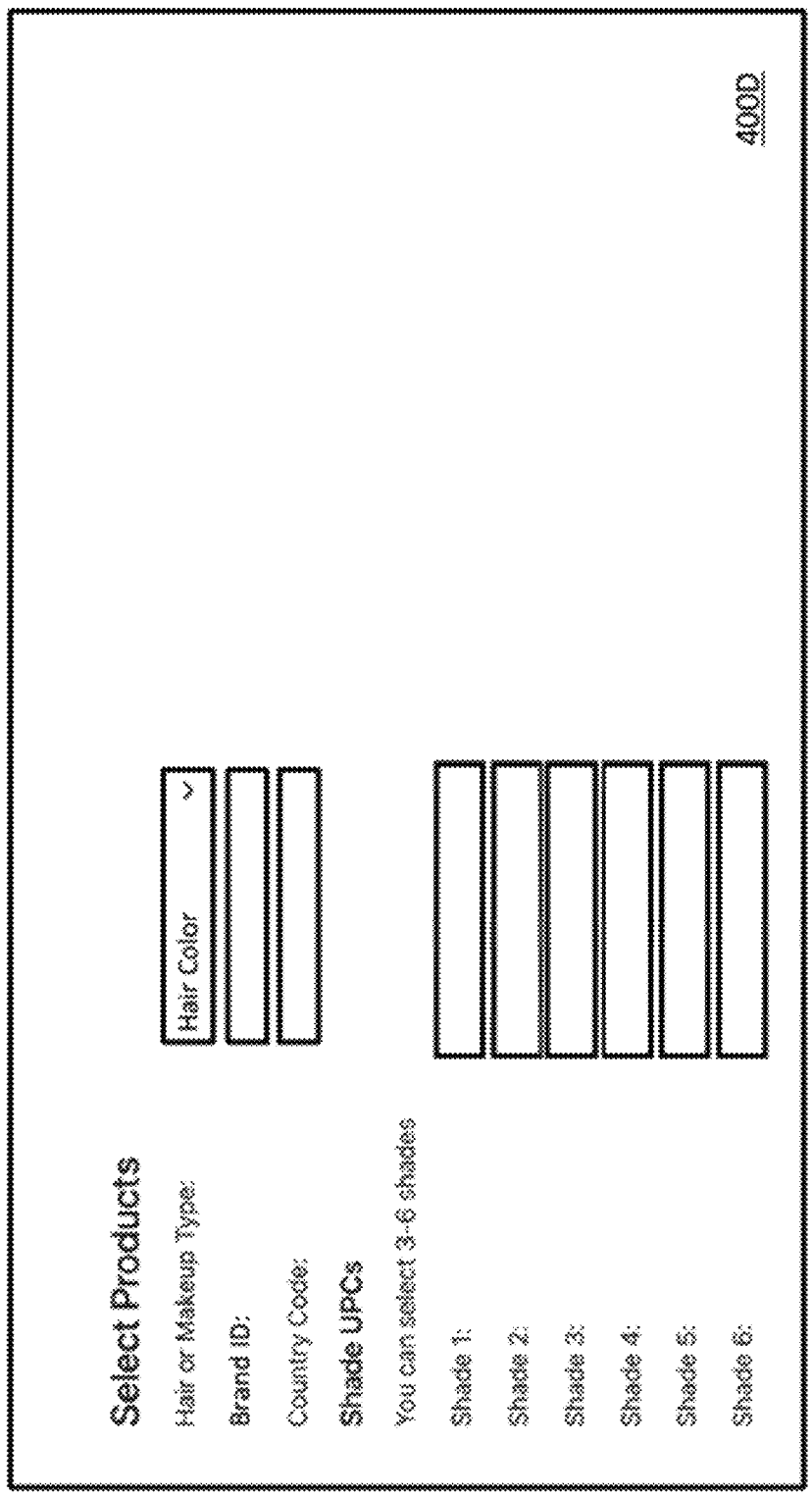

FIGS. 3A and 3B are illustrations of a webpage 300, in accordance with an embodiment, configured to present the interfaces of FIGS. 2A-2H as well as an interface 301 for the user image experience. FIG. 3A shows interface 200A of FIG. 2A integrated within the webpage. Webpage 300 further comprises a region including controls 302A, 302B and 302C for selecting among product categories for the VTO experience (for example to select product category lipstick, lip gloss or lip liner) while controls 304 permit selection of a specific product within a selected product category (e.g. a particular lipstick product) to try on virtually. Selection of one of the products configures (or updates) the product information at 206 and 214 and effect selection controls 204 in interface 200A. Each one of the controls 304 can include or be associated with an image of the product and/or text description, including a price. Webpage 300 includes region 306 comprising controls (not shown) for facilitating an e-commerce transaction, for example, to add a quantity of a product instance to a shopping cart. Webpage 300 includes region 308 comprising a chat interface to chat with an agent.

FIG. 3B shows webpage 300 including interface 301. Interface 201 can commence once the VTO assets are loaded and readied such as from the loading page interface 200F, as described. Interface 301 presents the user image experience portion of the VTO, wherein the user image 310 is presented. The user image 310 is obtained from the camera of the computing device. In a live mode the camera provides a live series of images (e.g. a video). The user VTO engine processes the image(s) and applies an effect thereto as selected via interface 301, for example. Image 310 can include a before image where no effect is applied or an after image where an instance of the effect is applied. Controls 204 select between the instances of the effect, in this case a lipstick effect. Thus a before image can comprise a live camera image with no processing by VTO engine or by processing by the VTO engine but with no effect applied. In an embodiment, interface 301 is identical to 200A, except without the icon 222 and message region 224 (and the associated control), and where model image 202 is replaced with a rendered camera input instead (e.g. user image 310). Icon 216 can be used here to navigate back to 200A, if desired.

FIGS. 4A, 4B, 4C and 4D are illustrations of interfaces 400A, 400B, 400C and 400D of a configuration portal in accordance with an embodiment. The interfaces 400A-400D comprise various input controls to enable a user to input configuration information for define the webpage components that when executed present the interfaces 200A-200F. Interfaces 400A-400DC include input controls to either select among pre-defined options, upload images such as model images and a border image, and provide text for display, for example. Interfaces 400A-400D enable interfaces 200A-200F in multiple languages. In an embodiment, interfaces 400A-400D show default English text for the interfaces 200A-200F and permit input of alternative text, which may be other than English. If no alternative text is entered, the default text is used to configure the webpage components.

Interface 400A Relates to:
  VTO dimensions to define the size of interface 200A-200F within a webpage;
  VTO border image to surround the model image, providing a background. The user can upload an image;
  Top icons color selection for icons 216, 218 and 220, for example to complement and be distinguished from the border image over which the icons are displayed;
  Various instances of text, which may also permit choice of display color information. Display text can relate to selecting a shade to try on, starting the camera (to invoke the VTO engine readiness) and loading text; and
  Generic popup information to apply to all popup interfaces (200B, 200C, and 200E), which primarily comprises color information for text and buttons.

The interfaces 400A-400C can present a thumbnail image for any color information (which is typically a color code from a color scale).

Interface 400B Relates to:
  Text input for respective popup interfaces, whether for controls labels or display information. The popup interfaces comprise consent popup interface 200C, model select pop-up interface 200B and information popup interface 200E;
  Selection interface to include the consent popup interface 200C in the webpage components;
  An optional external link such as a URL link to a privacy policy or other terms and conditions page; and
  Model image upload in respect of model images for the model select pop-up interface and for use in interfaces 200A and 200F with effects applied thereto.

Interface 400C Relates to:
  Logo information to appear at the top of interfaces 200A and 200F, for example, in region 221;
  Optional enablement of a compare feature, via icon 218;
  Data for interface 200F providing learn more information, navigable via control 210, for example; and
  Urchin Tracking Module (UTM) information to facilitate performance analysis of a digital marketing campaign.

Interface 400D Relates to:
  Product selection, which identifies the VTO engine such as hair color, lips, eyes, etc.;
  Brand name information (e.g. a Brand ID such as a code for a particular brand to identify it in a database search) and country code information indicate the product brand and country for the information to be presented in the experience; and
  Product section colours, for example, for controls 204 and region 208. In an embodiment, the colours are represented as Universal Product Codes such as stored in a product database (e.g. 102A). In an embodiment, between 3 and 6 colors can be selected.

Thus the portal interface enables receipt of configuration information that comprises any one or more of:
  a. text information for display in the collection of interfaces;
  b. font or font color information for text displayed in the collection of interfaces;
  c. a VTO engine selection;
  d. brand, product or service information for the VTO engine and collection of interfaces;

e. model images for the VTO engine and collection of interfaces;
f. a logo image to brand the collection of interfaces;
g. a selection of an optional interface for the collection of interfaces;
h. a selection of an optional feature for the collection of interfaces; and
i. digital advertising information to facilitate performance analysis of a digital marketing campaign; and
j. country or region information.

It is noted that more than one instance of a virtual try on experienced could be defined for a product in response to different information received, such as different colors.

In an embodiment, the configuration portal component 126, via a web-based interface, for example, receives and stores the customization information such as to data store 102A. Using scripting and other program code, templates for the various interface and other components for the webpage components are respectively retrieved and the respective components configured in accordance with the templates, the customization information and as may be applicable, product or service information pre-stored to data store 102A. By way of example, customization information may include a logo, display text information, font or font color information, and/or UTM information, etc. that is incorporated into the webpage components. Customization information may include data identifying a product and instances thereof which is used to obtain product data and instance data previously stored to the data store.

For batch processing of the model images as previously noted, the selected VTO engine can be provided to the webpage generator 128 via an application programming interface (API) or other mechanism such that the webpage generator can generate (e.g. pre-render) after model images for each model image received and each product instance. The after model images can be stored to data store 102A, for example. While such after model images are useful for the VTO experiences described herein, the images may be used in other manners such as other advertising, for example.

In an embodiment, the VTO engine is provided to batch produce after model images such as from provided model images and identification of products in a standalone manner. For example, a portal can be provided (not shown) to receive model images and product selection identification but without configuration information for production of additional website components such as the interfaces of a VTO experience as described. In another embodiment, not shown, a portal can be provided to receive model images and product selection identification with configuration information for production of different website components. In an embodiment, the different website components are configured to provide a model-only VTO experience. In an example, the model-only VTO experience can include the features and functions described with reference to FIGS. 2A-20, 2G-2H and 3A, and not include a user experience such as in FIGS. 2E-2F and 3B.

Other processing may define respective thumbnail images or smaller scale model images, for example for a model selection interface (e.g. interface 200B). The webpage generator 128 (or another component, not shown) can bundle or otherwise collect the webpage components including images and a user VTO engine associated to the user image experience and provide same to computing device 104 such as for content distribution. In an embodiment, the user VTO engine is pre-stored relative to computing device 104 and is appropriately identified in the webpage components to enable a user device to obtain an instance thereof to execute. The distribution of the webpage components can be responsive to country or other market identification information such as to geographically distribute the webpage components to appropriate content distribution devices (not additionally shown).

FIG. 5A is a flowchart of operations 500 of a computing device in accordance with an embodiment herein. For example, the operations may define a method of computing device 102. At 502, operations provide a portal to receive customization information to customize webpage components defining a virtual try on (VTO) experience for inclusion in a webpage to be presented by a user computing device. The webpage components, when executed by the user computing device, provide a collection of interfaces to present a model image experience to virtually try on instances of a product or a service. At 504, operations generate the webpage components using the customization information received via the portal and a VTO engine. For each instance of the product or service made available to virtually try on, the VTO engine pre-renders a model after image corresponding to an image of a model. The webpage components are generated to comprise each model after image and a user VTO engine that corresponds to the VTO engine used to pre-render each model after image. At 506, operations provide the webpage components for execution by the user computing device. The user VTO engine is configured to render a user after image for presenting to virtually try on the instances of the product or service on a before image of the user to provide a user image experience.

Figure 5B:
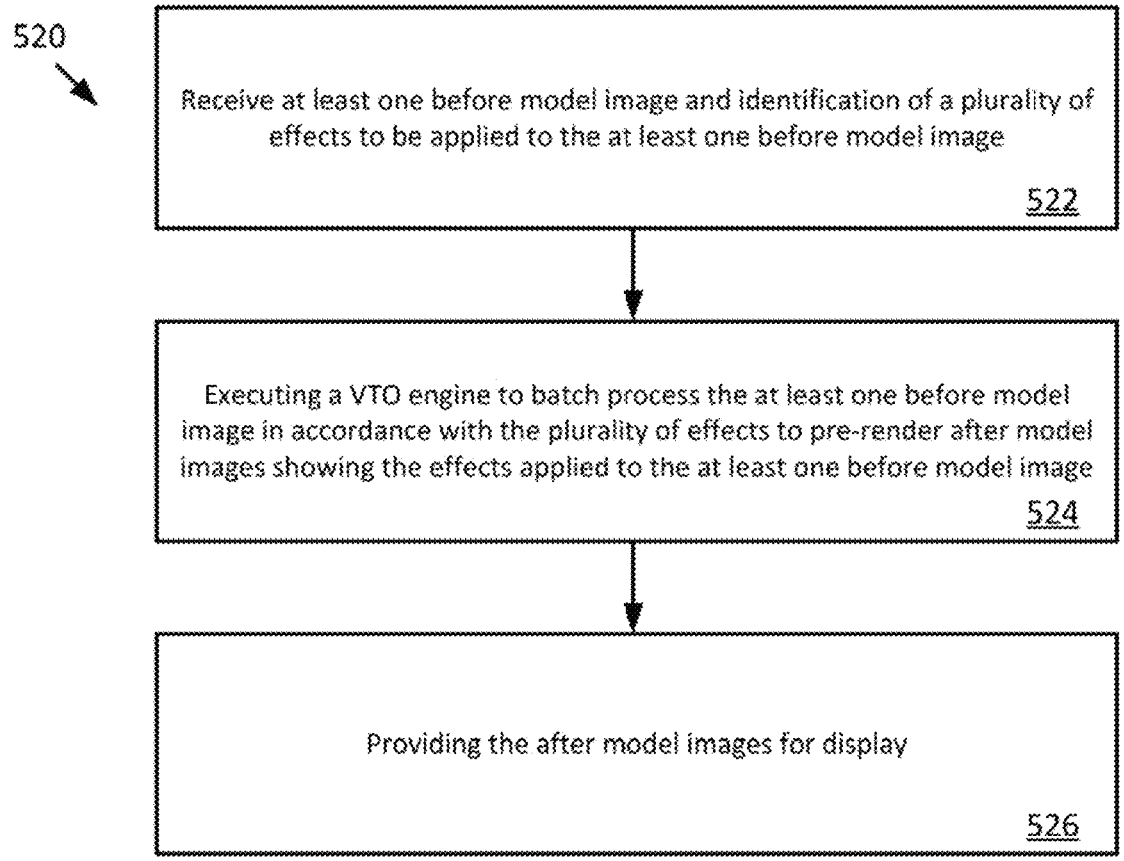

FIG. 5B is a flowchart of operations 520 of a computing device in accordance with an embodiment herein. For example, the operations may define a method of computing device 102. At 522, operations receive (e.g. via a configuration portal) at least one before model image and an identification of a plurality of effects to be applied to each of the at least one before model image. In an embodiment, the effects are associated with instances of a product or service such as to simulate a VTO. The effects can be stored to a data store and retrieved in accordance with the identification received. At 524, operations execute a VTO engine to batch process the at least one before model image in accordance with the plurality of effects to pre-render after model images showing the effects applied to the at least one before model image. At 526, the after model images are provided for use such as for display by a user computing device. The display can be as a component of a product or service advertisement, which may comprise a model-based VTO experience. The at least one before model image and the product/service effects can be supplied. In an embodiment (though not shown), prior to operations 520, for example, the effects are stored to the data store in association with identification information. The identification information can be provided such as for use when providing the at least one before model images and identification information in association with step 522. In an embodiment (though not shown), after operations 526, for example, website components are generated using at least some of the after model images and the website components are provided for execution such as to display the at least some of the after model images. In an embodiment (though not shown), information can be received to identify the VTO engine for executing the batch processing from a plurality of VTO engines. The various VTO engines can be configured to apply different effects, for example.

FIG. 6 is a flowchart of operations 600 of a computing device in accordance with an embodiment herein. For example, operations 600 may define a method for computing device 114, 116 or 118. At 602, operations present a virtual try on (VTO) experience to virtually try on instances of a product or a service, the VTO experience presented in two parts comprising a model image experience and a user image experience providing an augmented reality. At 604, operations, such as to present the model image experience, display after model images pre-rendered with effects associated with the instances of the product or service by a first VTO engine, the after model images received by the computing device as a part of webpage components executed by the computing device to provide the VTO experience. At 606, operations, such as to present the user image experience, display after user images rendered with effects associated with the instances by a corresponding second VTO engine executed by the computing device using one or more user before images of the user received from a camera of the computing device. And at 608, operations present the model user experience prior to presenting the user image experience, while the user image experience is being readied by the computing device. Thus operations 604, 606 and 608 can be performed as a portion of operations 602.

In addition to computing device and method aspects, a person of ordinary skill will understand that computer program product aspects are disclosed, where instructions are stored in a non-transient storage device (e.g. a memory, CD-ROM, DVD-ROM, disc, etc.) and that, when executed, the instructions cause a computing device to perform any of the method aspects stored herein.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers characteristics, compounds, chemical moieties or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

What is claimed is:

1. A method comprising:
   presenting, by a computing device, a virtual try on (VTO) experience to virtually try on instances of a product or a service, the VTO experience presented in two parts comprising a model image experience and a user image experience providing an augmented reality;
   wherein the model image experience comprises displaying after model images pre-rendered with effects associated with the instances of the product or service by a first VTO engine, the after model images received by the computing device as a part of webpage components executed by the computing device to provide the VTO experience;
   wherein the user image experience comprises displaying after user images rendered with effects associated with the instances by a corresponding second VTO engine executed by the computing device using one or more user before images of the user received from a camera of the computing device; and
   wherein the model image experience is presented by the computing device prior to presenting the user image experience, while the user image experience is being readied by the computing device,
   the method further comprising presenting during the model image experience a start control to receive input to start the user image experience; receiving input to start the user image experience; invoking the loading of the user image experience in response; and continuing to present the model image experience while the user image experience is loaded by the computing device.

2. The method of claim 1, wherein the product or service is one of a hair product, nail product, or makeup product.

3. The method of claim 1, wherein the webpage comprise a before model image where no effect is applied to the model and a before/after control to selectively display the before model image and a selected after model image to present a before/after virtual try on of the product or service.

4. The method of claim 1, wherein the webpage components for the user image experience comprise an effects selection interface to select between the plurality of effects to simulate different instances of the product or service in the after user images.

5. The method of claim 1, wherein the webpage components comprise after model images for a plurality of models and wherein the method presents a model selection interface to select between the plurality of model after images for presenting during the model image experience.

6. The method of claim 1 comprising presenting the VTO experience as an advertisement in a portion of a webpage.

7. The method of claim 6, wherein the advertisement comprises information to facilitate performance analysis of a digital marketing campaign.

8. The method of claim 1, wherein the first VTO engine is configured to execute on a server computing device and the corresponding second VTO engine is configured to execute on a user computing device to render same effects as the first VTO engine, and wherein the user computing device comprises fewer or small computing resources compared to the server computing device.

9. A method comprising:
   presenting, by a computing device, a virtual try on (VTO) experience to virtually try on instances of a product or a service, the VTO experience presented in two parts comprising a model image experience and a user image experience providing an augmented reality;
   wherein the model image experience comprises displaying after model images pre-rendered with effects associated with the instances of the product or service by a first VTO engine, the after model images received by the computing device as a part of webpage components executed by the computing device to provide the VTO experience;

wherein the user image experience comprises displaying after user images rendered with effects associated with the instances by a corresponding second VTO engine executed by the computing device using one or more user before images of the user received from a camera of the computing device; and wherein the model image experience is presented by the computing device prior to presenting the user image experience, while the user image experience is being readied by the computing device, wherein the model image experience is presented in an overlapping screen region with the user image experience and the method comprises presenting a control to switch between the user image experience and the model image experience.

10. A computing device comprising at least one processor and a non-transient storage medium storing computer readable instructions that, when executed by a processor of the computing device, cause the computing device to:

present a virtual try on (VTO) experience for a product or service comprising displaying an after model image from a plurality of after model images pre-rendered to show instances of product effects or service effects as a part of a model image experience; and present a user image VTO experience that presents after user images rendered with the product effects or service effects by a VTO engine executed by the computing device to provide an augmented reality for a user, wherein the model image experience is presented while the user image experience is readied by the computing device, wherein the instructions cause the computing device to: present during the model image experience a start control to receive input to start the user image experience; receive input to start the user image experience; invoke the loading of the user image experience in response; and continue to present the model image experience while the user image experience is loaded by the computing device.

11. The computing device of claim 10, wherein the product or service is one of a hair product, nail product, or makeup product.

12. The computing device of claim 10, wherein the instructions cause the computing device to receive a before model image where no effect is applied to the model and present before/after control to selectively display the before model image and a selected after model image to present a before/after virtual try on of the product or service.

13. The computing device of claim 10, wherein the instructions cause the computing device to present an effects selection interface to select between the product effects or services to simulate different instances of the product or service in the after user images.

14. The computing device of claim 10, wherein the instructions cause the computing device to receive after model images for a plurality of models and present a model selection interface to select between the plurality of model after images for presenting during the model image experience.

15. The computing device of claim 10, wherein the instructions cause the computing device to present the VTO experience as an advertisement in a portion of the webpage.

16. The computing device of claim 10, wherein the computing device is a user computing device and the VTO engine comprises a user VTO engine, and wherein the instructions cause the user computing device to receive the after model images as pre-rendered images generated by a corresponding VTO engine configured to execute on a separate computing device from the user computing device.

17. A computing device comprising at least one processor and a non-transient storage medium storing computer readable instructions that, when executed by a processor of the computing device, cause the computing device to:

present a virtual try on (VTO) experience for a product or service comprising displaying an after model image from a plurality of after model images pre-rendered to show instances of product effects or service effects as a part of a model image experience; and present a user image VTO experience that presents after user images rendered with the product effects or service effects by a VTO engine executed by the computing device to provide an augmented reality for a user, wherein the model image experience is presented while the user image experience is readied by the computing device, wherein the instructions cause the computing device to present the model image experience in an overlapping in a screen region with the user image experience and present a control to switch between the user image experience and the model image experience.

18. A computer program product comprising a non-transitory storage medium storing computer readable instructions that, when executed by a processor of a computing device, cause the computing device to:

present a virtual try on (VTO) experience for a product or service comprising displaying an after model image from a plurality of after model images pre-rendered to show instances of product effects or service effects; and present a user image VTO experience that presents after user images rendered with the product effects or service effects by a VTO engine executed by the computing device to provide an augmented reality for a user, wherein the model image experience is presented while the user image experience is readied by the computing device, wherein the instructions cause the computing device to: present during the model image experience a start control to receive input to start the user image experience; receive input to start the user image experience; invoke the loading of the user image experience in response: and continue to present the model image experience while the user image experience is loaded by the computing device.

* * * * *